(12) United States Patent
Hall et al.

(10) Patent No.: US 7,193,527 B2
(45) Date of Patent: Mar. 20, 2007

(54) SWIVEL ASSEMBLY

(75) Inventors: David R. Hall, Provo, UT (US); David S. Pixton, Lehi, UT (US); Michael Briscoe, Lehi, UT (US); Kline Bradford, Orem, UT (US); Michael Rawle, Springville, UT (US); David B. Bartholomew, Springville, UT (US); James McPherson, Sandy, UT (US)

(73) Assignee: IntelliServ, Inc., Provo, UT (US)

( * ) Notice: Subject to any disclaimer, the term of this patent is extended or adjusted under 35 U.S.C. 154(b) by 317 days.

(21) Appl. No.: 10/710,825

(22) Filed: Aug. 5, 2004

(65) Prior Publication Data
US 2005/0046586 A1   Mar. 3, 2005

Related U.S. Application Data

(63) Continuation-in-part of application No. 10/315,263, filed on Dec. 10, 2002, now Pat. No. 7,098,802.

(51) Int. Cl.
*G01V 3/00* (2006.01)
(52) U.S. Cl. .................. 340/854.3; 175/40; 403/23; 403/78; 439/13
(58) Field of Classification Search ............ 340/854.3, 340/853.7, 855.1; 324/303; 175/40; 403/23, 403/78; 439/13
See application file for complete search history.

(56) References Cited

U.S. PATENT DOCUMENTS

| | | | |
|---|---|---|---|
| 2,414,719 A | | 1/1947 | Cloud |
| 3,518,608 A | | 6/1970 | Papadopoulos |
| 3,753,206 A | * | 8/1973 | Busuttil et al. ............ 439/194 |
| 4,738,325 A | | 4/1988 | Bullivant et al. |
| 4,788,544 A | | 11/1988 | Howard |
| 5,468,153 A | * | 11/1995 | Brown et al. ................ 439/13 |
| 5,823,257 A | * | 10/1998 | Peyton ..................... 166/65.1 |
| 6,012,015 A | | 1/2000 | Tubel |
| 6,018,301 A | | 1/2000 | Smith |
| 6,075,461 A | | 6/2000 | Smith |
| 6,144,316 A | | 11/2000 | Skinner |
| 6,177,882 B1 | | 1/2001 | Ringgenberg et al. |

(Continued)

OTHER PUBLICATIONS

PCT/US03/16475, Published Dec. 4, 2003, Applicant Baker Hughes: International Search Report, "Document Considered to Be Relevant".

*Primary Examiner*—Albert K. Wong
(74) *Attorney, Agent, or Firm*—Tyson J. Wilde; Jeffery E. Daly

(57) ABSTRACT

A swivel assembly for a downhole tool string comprises a first and second coaxial housing cooperatively arranged. The first housing comprises a first transmission element in communication with surface equipment. The second housing comprises a second transmission element in communication with the first transmission element. The second housing further comprises a third transmission element adapted for communication with a network integrated into the downhole tool string. The second housing may be rotational and adapted to transmit a signal between the downhole network and the first housing. Electronic circuitry is in communication with at least one of the transmission elements. The electronic circuitry may be externally mounted to the first or second housing. Further, the electronic circuitry may be internally mounted in the second housing. The electronic circuitry may be disposed in a recess in either first or second housing of the swivel.

17 Claims, 10 Drawing Sheets

U.S. PATENT DOCUMENTS

| | | |
|---|---|---|
| 6,252,518 B1 | 6/2001 | Laborde |
| 6,392,317 B1 | 5/2002 | Hall et al. |
| 6,670,880 B1 | 12/2003 | Hall et al. |
| 6,688,396 B2 | 2/2004 | Floerke et al. |
| 6,717,501 B2 | 4/2004 | Hall et al. |
| 6,799,632 B2 | 10/2004 | Hall et al. |
| 6,821,147 B1 | 11/2004 | Hall et al. |
| 6,830,467 B2 | 12/2004 | Hall et al. |
| 6,844,498 B2 | 1/2005 | Hall et al. |
| 6,866,306 B2 | 3/2005 | Boyle et al. |
| 6,888,473 B1 | 5/2005 | Hall et al. |
| 6,913,093 B2 | 7/2005 | Hall et al. |
| 6,929,493 B2 | 8/2005 | Hall et al. |
| 6,945,802 B2 | 9/2005 | Hall et al. |
| 6,968,611 B2 | 11/2005 | Hall et al. |
| 2004/0039466 A1 | 2/2004 | Lilly et al. |
| 2004/0104797 A1 | 6/2004 | Hall et al. |
| 2004/0113808 A1 | 6/2004 | Hall et al. |
| 2004/0164833 A1 | 6/2004 | Hall et al. |
| 2004/0145492 A1 | 7/2004 | Hall et al. |
| 2004/0150532 A1 | 8/2004 | Hall et al. |
| 2004/0164838 A1 | 8/2004 | Hall et al. |
| 2004/0216847 A1 | 11/2004 | Hall et al. |
| 2004/0244916 A1 | 12/2004 | Hall et al. |
| 2004/0244984 A1 | 12/2004 | Hall et al. |
| 2004/0246142 A1 | 12/2004 | Hall et al. |
| 2005/0001735 A1 | 1/2005 | Hall et al. |
| 2005/0001736 A1 | 1/2005 | Hall et al. |
| 2005/0001738 A1 | 1/2005 | Hall et al. |
| 2005/0035874 A1 | 2/2005 | Hall et al. |
| 2005/0035875 A1 | 2/2005 | Hall et al. |
| 2005/0035876 A1 | 2/2005 | Hall et al. |
| 2005/0036507 A1 | 2/2005 | Hall et al. |
| 2005/0039912 A1 | 2/2005 | Hall et al. |
| 2005/0045339 A1 | 3/2005 | Hall et al. |
| 2005/0046586 A1 | 3/2005 | Hall et al. |
| 2005/0048590 A1 | 3/2005 | Hall et al. |
| 2005/0067159 A1 | 3/2005 | Hall et al. |
| 2005/0070144 A1 | 3/2005 | Hall et al. |
| 2005/0082092 A1 | 4/2005 | Hall et al. |
| 2005/0092499 A1 | 5/2005 | Hall et al. |
| 2005/0093296 A1 | 5/2005 | Hall et al. |
| 2005/0095827 A1 | 5/2005 | Hall et al. |
| 2005/0115717 A1 | 7/2005 | Hall et al. |
| 2005/0145406 A1 | 7/2005 | Hall et al. |
| 2005/0150653 A1 | 7/2005 | Hall et al. |
| 2005/0161215 A1 | 7/2005 | Hall et al. |
| 2005/0173128 A1 | 8/2005 | Hall et al. |
| 2005/0212530 A1 | 9/2005 | Hall et al. |
| 2005/0236160 A1 | 10/2005 | Hall et al. |
| 2005/0279508 A1 | 12/2005 | Hall et al. |
| 2005/0284659 A1 | 12/2005 | Hall et al. |
| 2005/0284662 A1 | 12/2005 | Hall et al. |
| 2005/0284663 A1 | 12/2005 | Hall et al. |
| 2005/0285645 A1 | 12/2005 | Hall et al. |
| 2005/0285705 A1 | 12/2005 | Hall et al. |
| 2005/0285706 A1 | 12/2005 | Hall et al. |
| 2005/0285751 A1 | 12/2005 | Hall et al. |
| 2005/0285752 A1 | 12/2005 | Hall et al. |
| 2005/0285754 A1 | 12/2005 | Hall et al. |

* cited by examiner

SWIVEL ASSEMBLY

CROSS REFERENCE TO RELATED APPLICATIONS

The present application is a continuation-in-part of U.S. patent application Ser. No. 10/315,263 now U.S. Pat. No. 7,098,802 filed on Dec. 2, 2002, which is herein incorporated by reference.

FEDERAL RESEARCH STATEMENT

This invention was made with government support under Contract No. DE-FC26-01NT41229 awarded by the U.S. Department of Energy. The government has certain rights in the invention.

BACKGROUND OF INVENTION

This invention relates to a swivel assembly for a downhole tool string. For more than 50 years proposals for transmitting an electronic signal along the length of the tool string used in the exploration and production of hydrocarbons and subterranean energy sources have met limited success for reasons associated with numerous technological obstacles; namely transmitting reliable signals across the joints of the downhole tool string. One successful system disclosed in U.S. Pat. No. 6,670,880 to Hall, which is herein incorporated by reference; introduces a system for transmitting data through a string of downhole components. First and second magnetically conductive and electrically insulating elements are included in both ends of the components. Each element includes a trough with an electrically conducting coil located inside. An electrical conductor connects the coils. Varying currents applied to this system are transformed into magnetic fields which can cross the joints of the downhole components and transform back to varying currents.

A top-hole swivel is a key surface-mounted drill rig component in the tool string for such a system as described in the "880 patent. It functions as the entry point for drilling fluids and as a load transfer point between the drill string and rig. In some cases it has been used as a data gathering point for logging the well and for monitoring drill string dynamics. When adapted for signal transmission, the swivel becomes the interface between the outside world and the system for transmitting data integrated into the downhole tool string.

Several apparatuses in the art are capable of transmitting data from a tool string to equipment located on the surface. U.S. Pat. Nos. 6,018,301 and 6,075,461 disclose an apparatus for communicating information between downhole equipment and surface equipment. The electromagnetic signal repeater apparatus comprises a housing that is securably mountable to the exterior of a pipe string disposed in a well bore. The housing includes first and second housing subassemblies. The first housing subassembly is electrically isolated from the second subassembly and is secured thereto with a nonconductive strap. The second housing subassembly is electrically coupled with the pipe string and is secured thereto with a conductive strap. An electronics package and a battery are disposed within the housing. The electronics package receives, processes, and retransmits the information between the downhole equipment and the surface equipment via electromagnetic waves.

Another system for transmitting data from a drill string to surface equipment is disclosed in U.S. Pat. Nos. 6,144,316 and 6,177,882. A downhole communications system includes an electromagnetic-to-acoustic signal repeater for communicating information between surface equipment and downhole equipment. The repeater comprises an electromagnetic receiver and an acoustic transmitter. The receiver receives an electromagnetic input signal and transforms the electromagnetic input signal to an electrical signal that is inputted into an electronics package that amplifies the electrical signal and forwards the electrical signal to the transmitter that transforms the electrical signal to an acoustic output signal that is acoustically transmitted.

SUMMARY OF INVENTION

A swivel assembly for a downhole tool string comprises a first and second coaxial housing cooperatively arranged. The first housing comprises a first transmission element in communication with surface equipment. The second housing comprises a second transmission element in communication with the first transmission element. The second housing further comprises a third transmission element adapted for communication with a network integrated into the downhole tool string. An internal conductor may be disposed within a passage of the second housing and may connect the second and third transmission elements. Further, an external conductor may connect the first transmission element to surface equipment. The disclosed swivel assembly allows data transmission from a network integrated into a downhole tool string to surface equipment, such that data from downhole may be utilized from the surface.

The second housing may rotate with the downhole tool string and may be adapted to transmit a signal between the downhole network and the first housing. The second housing may remain stationary; thereby, preventing the external conductor from wrapping around the swivel assembly. An electronic component is in communication with at least one of the transmission elements, which may aid in signal transmission.

The electronic circuitry may be externally mounted to the first or second housing. Further, the electronic circuitry may be internally mounted in the second housing. The electronic circuitry may be disposed in a recess in either the first or second housing of the swivel assembly. Disclosed is a recess between the second and third transmission elements. Also disclosed is a swivel assembly comprising recess disposed in an inner circumference of the second housing or an outer circumference of the second housing.

Debris such as drilling mud, corrosive fluid, water, dirt, and rocks may damage the connection between the first and second housings. To protect against such debris, a shield may be externally mounted to the first housing and protect a connection between the first and second housings. Alternatively, the shield may be externally mounted to the second housing. The shield may have a means of lubricating the connection while maintaining a clean environment for the first and second transmission elements to transmit data.

The swivel assembly may comprise electronic circuitry such as a signal filtering circuit, a signal error checking circuit, a device control circuit, a modem, a digital processor, an optical regenerator, an optical transmitter, an optical receiver, a repeater circuit, a sensor, a router, a switch, memory, an amplifier, a data compression circuit, a data rate adjustment circuit, a piezoelectric device, a light, a gauge, The swivel assembly of claim 1, wherein the electronic circuitry comprises components selected from the group consisting of a signal filtering circuit, a signal error checking circuit, a device control circuit, a modem, a digital processor, an optical regenerator, an optical transmitter, an optical receiver, a repeater circuit, a sensor, a router, a switches, memory, an amplifier, a clock source, a data compression circuit, a data rate adjustment circuit, a piezoelectric device, a light, a gauge, a wireless transceiver, a digital/optical converter, an analogue/optical converter, and a microcontroller. The swivel may further comprise an internal power source. Alternatively, the electronic circuitry may receive electricity from an external power source. Electronics, such as a repeater circuit, may aid in signal transmission between the downhole tool string to surface equipment.

Also disclosed is a swivel assembly for a downhole tool string comprising a second housing having a cylindrical form comprising an inner circumference and an outer circumference, wherein the second housing is disposed within the inner circumference of the first housing.

DETAILED DESCRIPTION

This description is meant to illustrate the present invention and not to limit its scope. Other embodiments of the present invention are possible within the scope and spirit of the claims.

Figure 1:
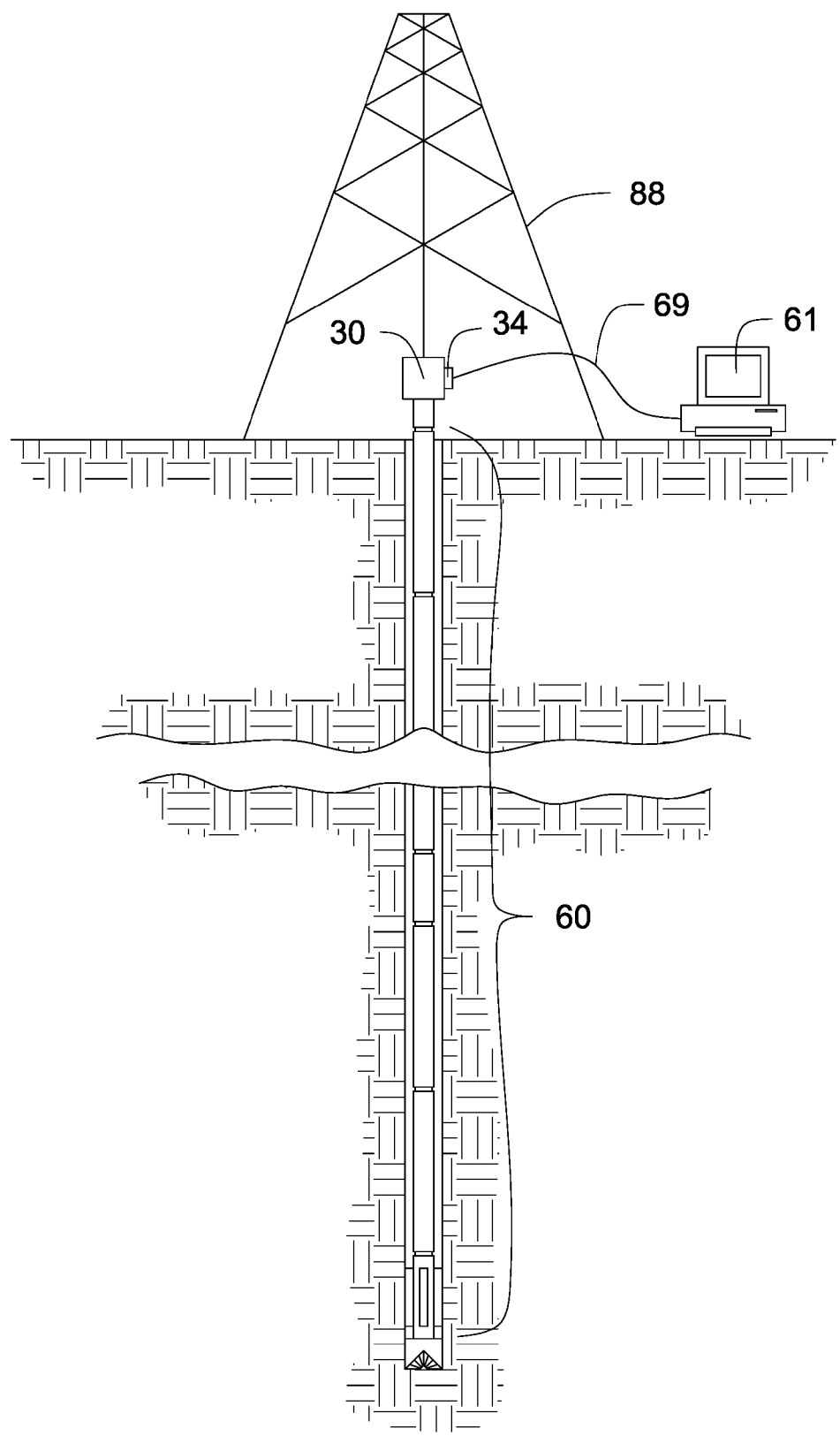
FIG. 1 is a perspective view of a downhole tool string suspended by a derrick.

FIG. 1 shows an embodiment of the downhole tool string 60 suspended by a derrick 88. A swivel assembly 30 comprises an electronics pack 34 which connects to surface equipment 61 by an external conductor 69.

Figure 2:
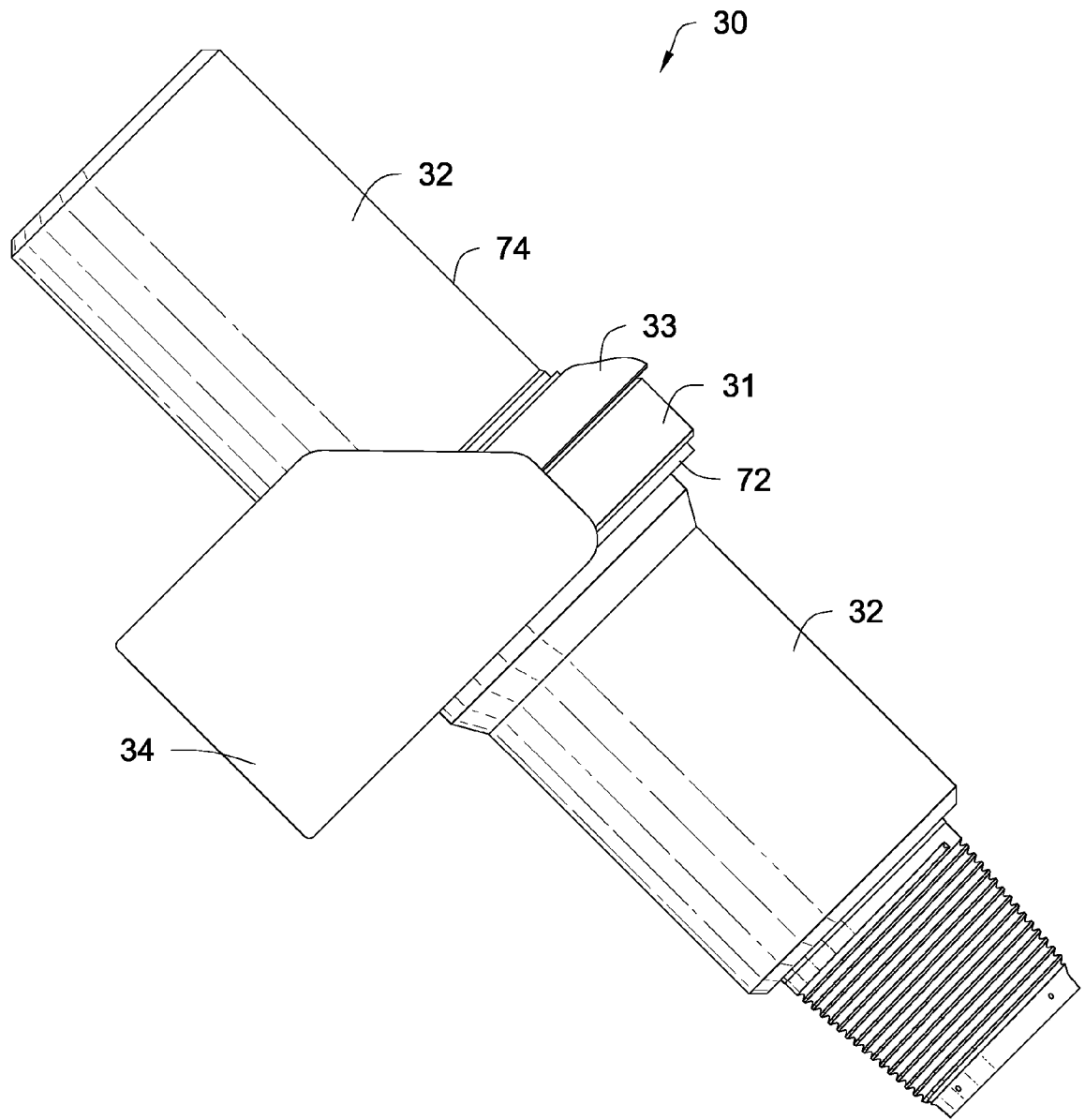
FIG. 2 is an orthogonal view of a swivel assembly of the present invention.

FIG. 2 shows a detailed view of the swivel assembly 30. The swivel assembly 30 comprises a first housing 31 and a second housing 32. The second housing 32 is adapted to rotate with a downhole tool string. Externally mounted to the first housing 31 is a shield 33 adapted to protect the connection between the first and second housings 31, 32 of the swivel assembly 30. Debris such as drilling mud, corrosive fluid, water, dirt, and rocks may damage the connection between the first and second housings 31, 32, which the shield 33 blocks. The electronics pack 34 is externally mounted to the first housing 31 of the swivel assembly 30. The first and second housing have a cylindrical form. The cylindrical form of the second housing 32 comprises an outer circumference 74 which is disposed in an inner circumference 72 of the first housing.

Figure 3:
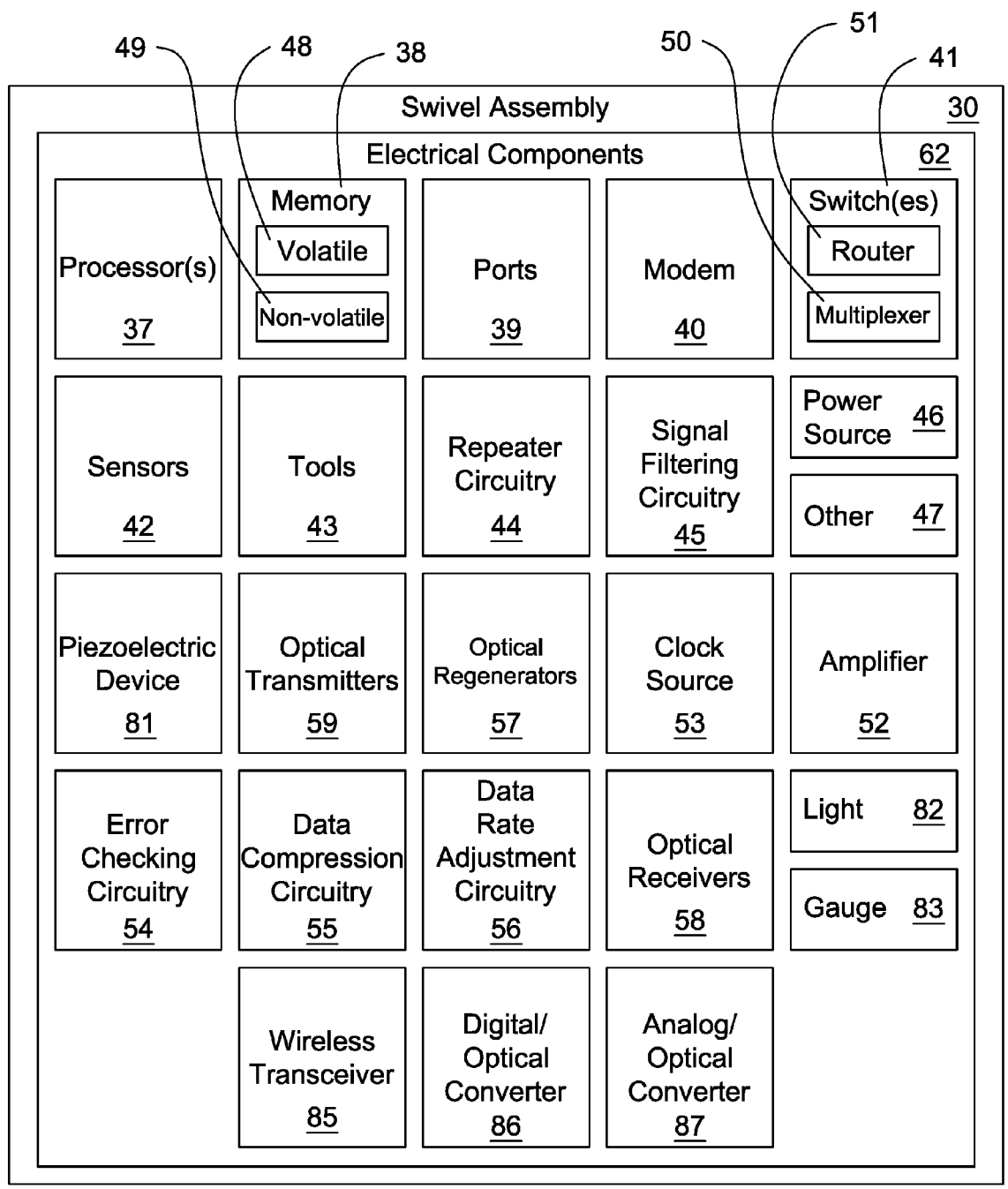
FIG. 3 is a block diagram of electronics in a swivel assembly of the present invention.

FIG. 3 shows an embodiment of electrical components 62 that may be included in the electronics pack 34. The electronics pack 34 may comprise an internal power source 46, such as a battery. The electrical components 62 contained in the electronics pack 34 may be selected from the group consisting of signal filtering circuitry 45; switches 41, such as multiplexers 50 or routers 51; sensors 42; memory 38, volatile 48 or non-volatile 49; repeater circuitry 44; modems 40; processors 37, including digital processors and microcontrollers; control circuitry for downhole tools 43; ports 39; amplifiers 52; clock sources 53; signal error checking circuitry 54; data compression circuitry 55; data rate adjustment circuitry 56; piezoelectric devices 81; lights 82; gauges 83; a wireless transceiver 85; and other hardware devices 47 known in the art. In embodiments where optical fibers cables are used in the downhole tool string, the swivel assembly 30 may comprise optical receivers 58, optical regenerators 57, or optical transmitters 59. The swivel assembly 30 may further comprise a digital/optical converter 86 or an analogue/optical converter 87.

In wet drilling environments, such as off shore drilling, a wireless transceiver 85, digital/optical converter 86, or a analogue/optical converter 87 may be advantageous in the swivel assembly 30 because it may allow an optical or radio communication to the surface equipment 61 verses a electrical communication, which may become hazardous. The digital/optical converter 86 may be capable of transmitting digital signals to optical signals and vice versa. The analogue/optical converter 87 may also be capable of transmitting analogue signals to optical signals and vice versa. Thus, an electrical signal may be transmitted through the pipes, while an optical signal may be transmitted on the surface.

Sensors 42 may be associated with the swivel assembly 30. The sensors 42 may gather useful data about the condition of the of the swivel assembly 30. For example strain gauges associated with the swivel assembly 30 may measure the strain experienced by the swivel from the weight of the downhole tool string. Further sensors measuring friction or heat between the first and second housing 31, 32 may indicate when a lubricant needs to added to the connection. If an actuator or other device is associated with the swivel assembly 30 a switch 41 may direct signals to the actuator instead of to the surface equipment or to the downhole tool string.

Figure 4:
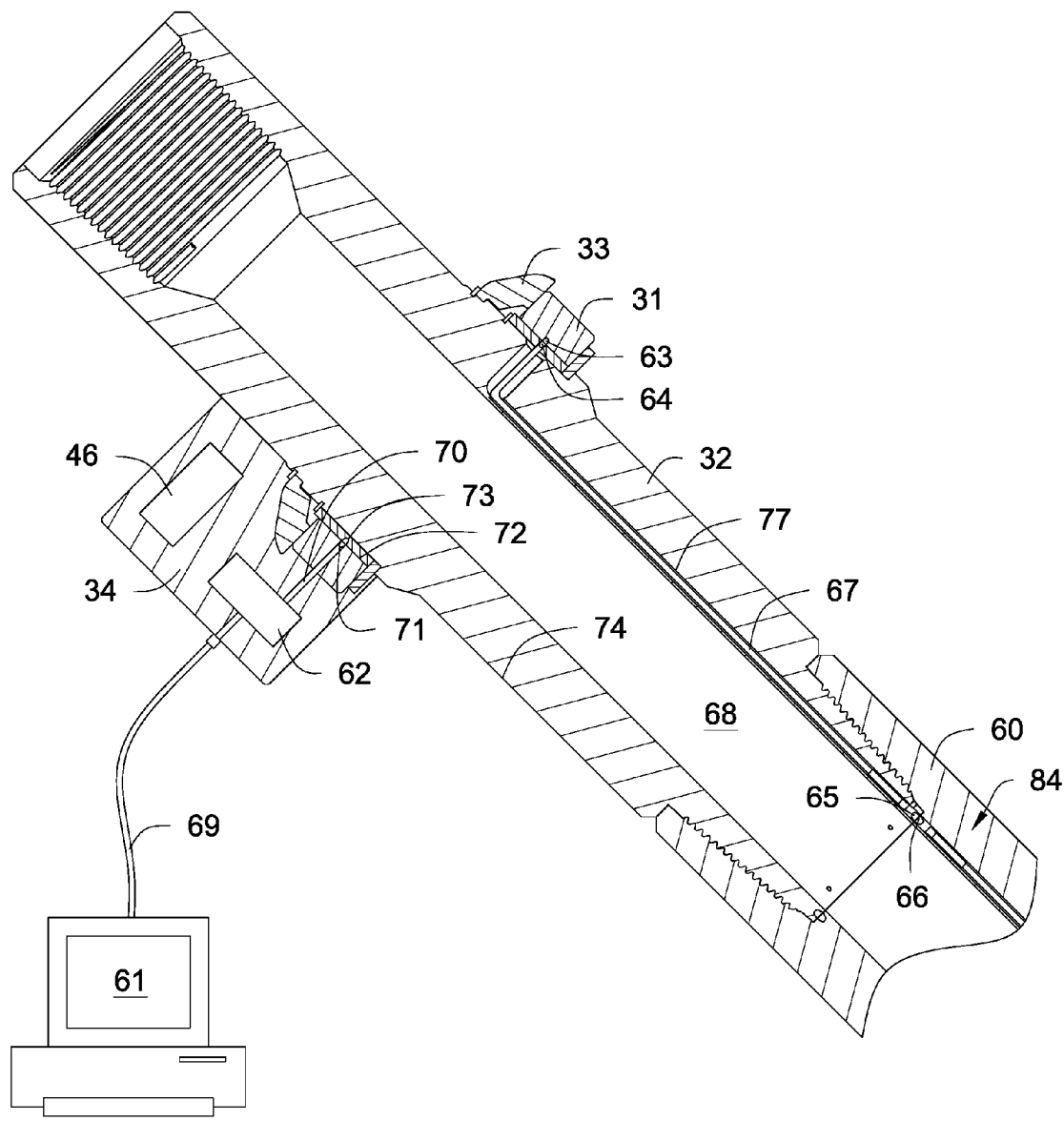
FIG. 4 is a cross sectional view of a swivel assembly of the present invention attached to a tool string component.

FIG. 4 is a cross sectional view of the swivel assembly 30 mechanically and electrically attached to a downhole tool string 60 and electrically connected to surface equipment 61. The surface equipment 61 may be a personal computer. The surface equipment 61 may comprise a connection to a local area network or to a global positioning system. The first transmission element 63 has an annular form and lies within a groove 71 in the inner circumference 72 of the first housing 31. The second transmission element 64 also has an annular form, is coaxial and adjacent to the first transmission element 63, and lies in a groove 73 in the outer circumference 74 of the second housing 32. The first and second transmission elements 63, 64 are cooperatively arranged such that a signal may be passed between the first and second housings 31, 32.

An internal conductor 67 disposed in a passage 77 connects the second and third transmission elements 64, 65. The internal conductor 67 may be a copper wire, a coaxial cable, twin axial cable, a triaxial cable, a fiber optic cable, or a ribbon cable. The transmission elements 63, 64, 65, 66 may be inductive couplers, direct electrical contact, or fiber optic couplers. Preferably, the downhole tool string 60 has an integrated network 84 capable of transmitting data from downhole to the surface. Compatible systems for transmitting data between the third transmission element 65 of the swivel assembly 30 and the transmission element 66 of the downhole tool string 60 are described in U.S. Pat. No. 6,670,880 and 6,717,501 to Hall.

Still referring to FIG. 4, a conductor 70 connects the first transmission element 63 to the electrical components 62 in the electronics pack 34. The electrically components 62 may modify to the signal before passing the signal to either the surface equipment 61 or the downhole tool string 60. A power source 46 may be located adjacent the electronic components 62, within the electronics pack 34. Alternatively, an external power source, such as a generator on the derrick may be used. An external conductor 69 allows the surface equipment 61 to be in electrical communication with the first transmission element 63. The external conductor 69 may be a copper wire, a coaxial a cable, twin axial cable, a triaxial cable, a fiber optic cable, or a ribbon cable.

Repeater circuits 44 may be placed in the downhole tool string 60. A signal coming from the surface equipment 61 may attenuate as it travels on the external conductor 69, may further attenuate as it passes through the swivel assembly 30, and attenuate as it passes through the components of the downhole tool string 60. When the attenuated signal reaches an attenuated threshold, a signal can no longer be received. Once the attenuated threshold is reached a component comprising a repeater circuit 44 may be added to the downhole tool string 60. However, if a repeater circuit 44 is provided in the swivel assembly 30 then the attenuation from the surface equipment 61 to the swivel assembly 30 experienced in the external conductor 69 may be restored once the signal reaches the swivel assembly 30. Since the signal is repeated in the swivel assembly 30 more components may be added to the tool string 60 before reaching the attenuated threshold and components containing repeater circuits 44 may be added to the tool string farther apart. Other electronic components 62 may also aid in data transmission.

Electronic components 62 may also include a piezoelectric device 81, such as a speaker; a light 82; or a gauge 83 for communicating to a worker on the derrick useful information. Useful information may be warnings indicating a high pressure kick or a release of a harmful gas. The advantage of having a warning indicator associated with the swivel assembly 30 allows notification to workers on the derrick immediately instead of notifying the surface equipment first and then relaying that information to workers on the derrick.

Figure 5:
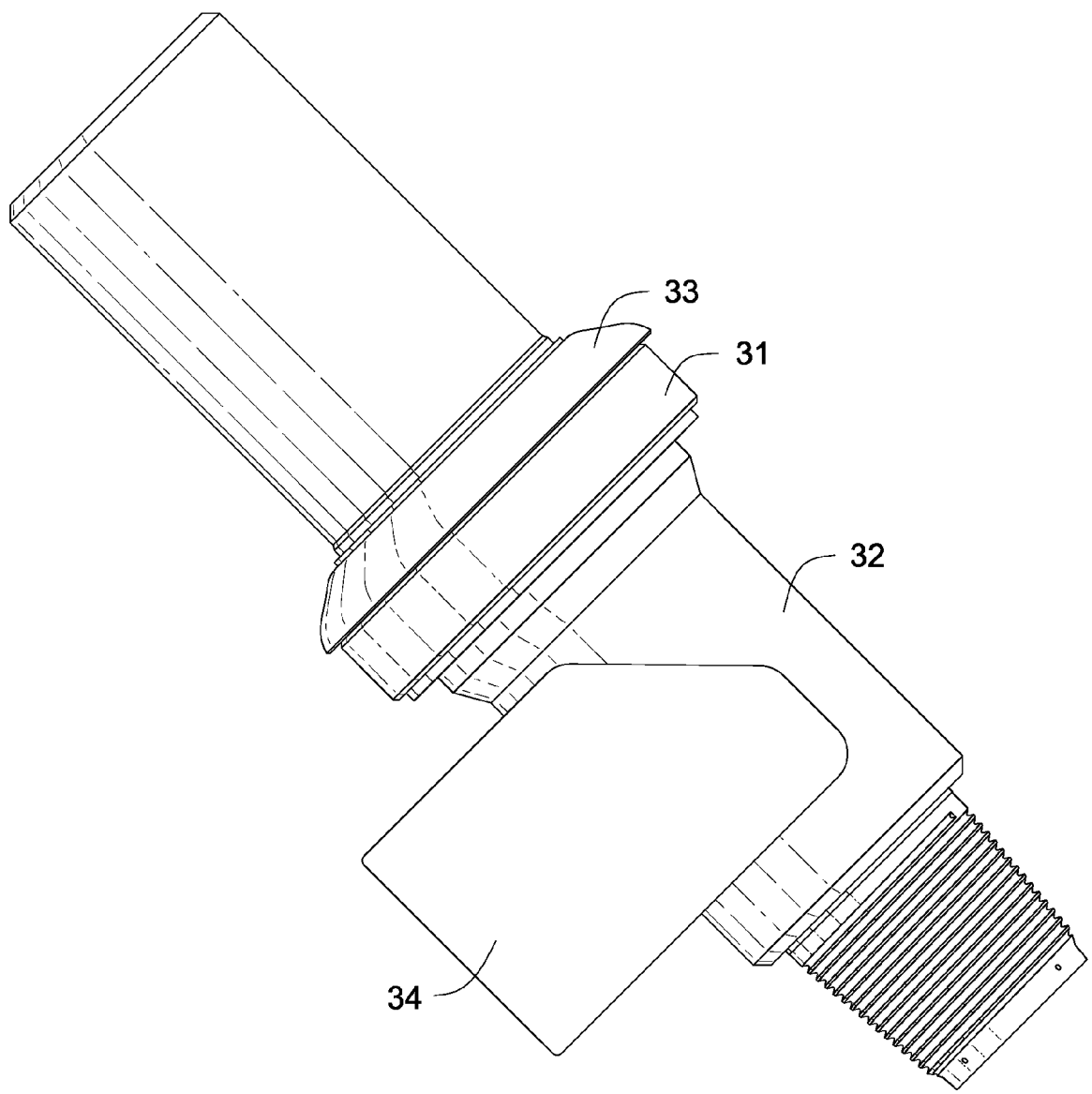
FIG. 5 is an orthogonal view of a swivel assembly of the present invention.

FIG. 5 shows an embodiment of the swivel assembly 30 where the electronics pack 34 is attached to the second housing 32. The electronics pack 34 may rotate with the second housing 32. An advantage to having the electronic pack 34 attached to the second housing 32, is that a repeater circuit 44 may now be located between the second and third transmission elements 64, 65 allowing any attenuation occurring during the transmission between the first and second transmission elements 31, 32 to be restored before the signal is passed to the downhole tool string 60.

Figure 6:
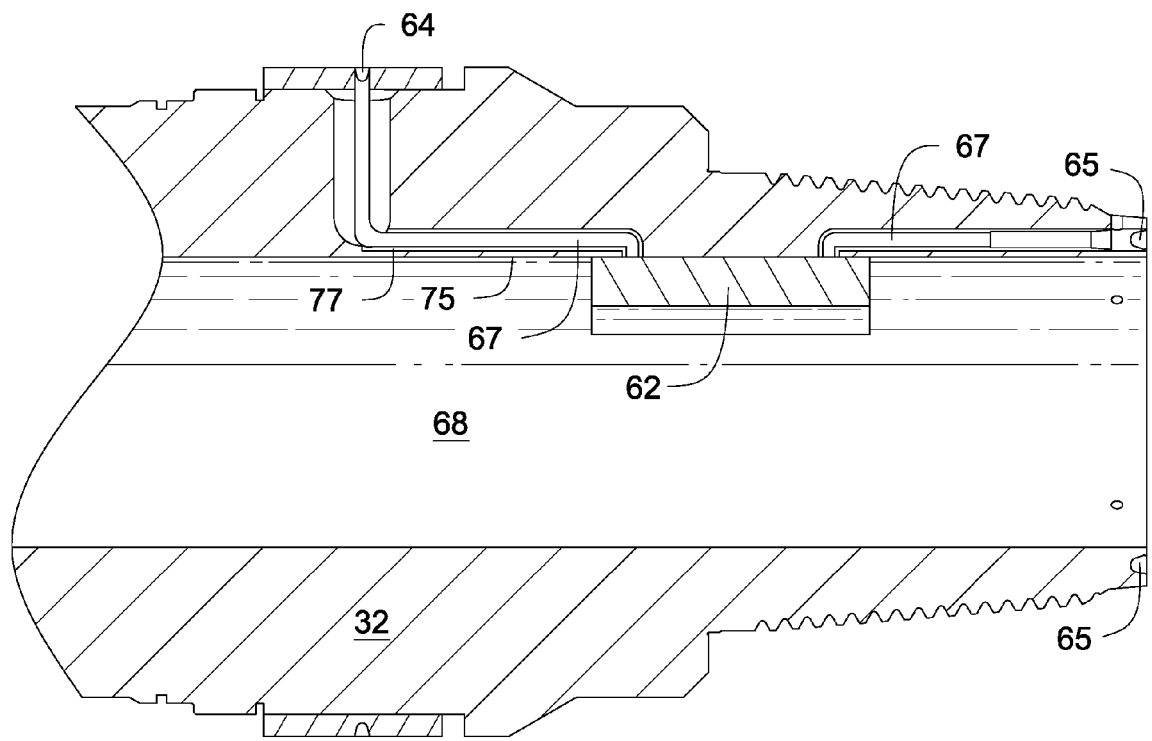
FIG. 6 is a partial cross sectional view of a swivel assembly of the present invention.
Figure 7:
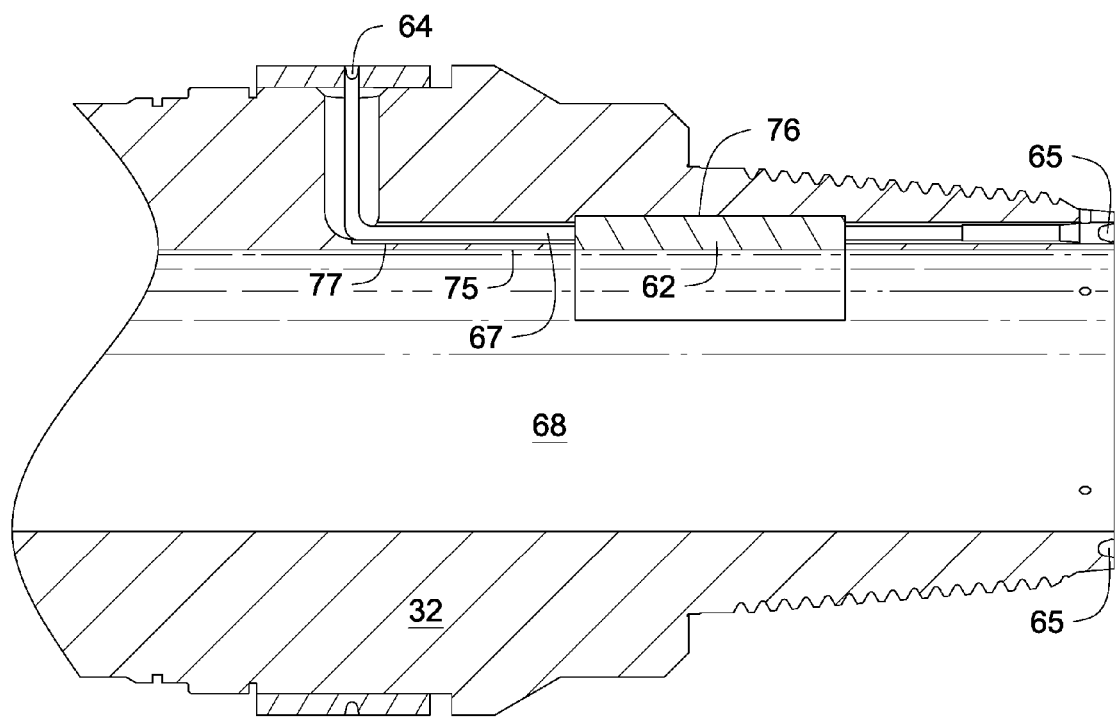
FIG. 7 is a partial cross sectional view of a swivel assembly of the present invention.
Figure 8:
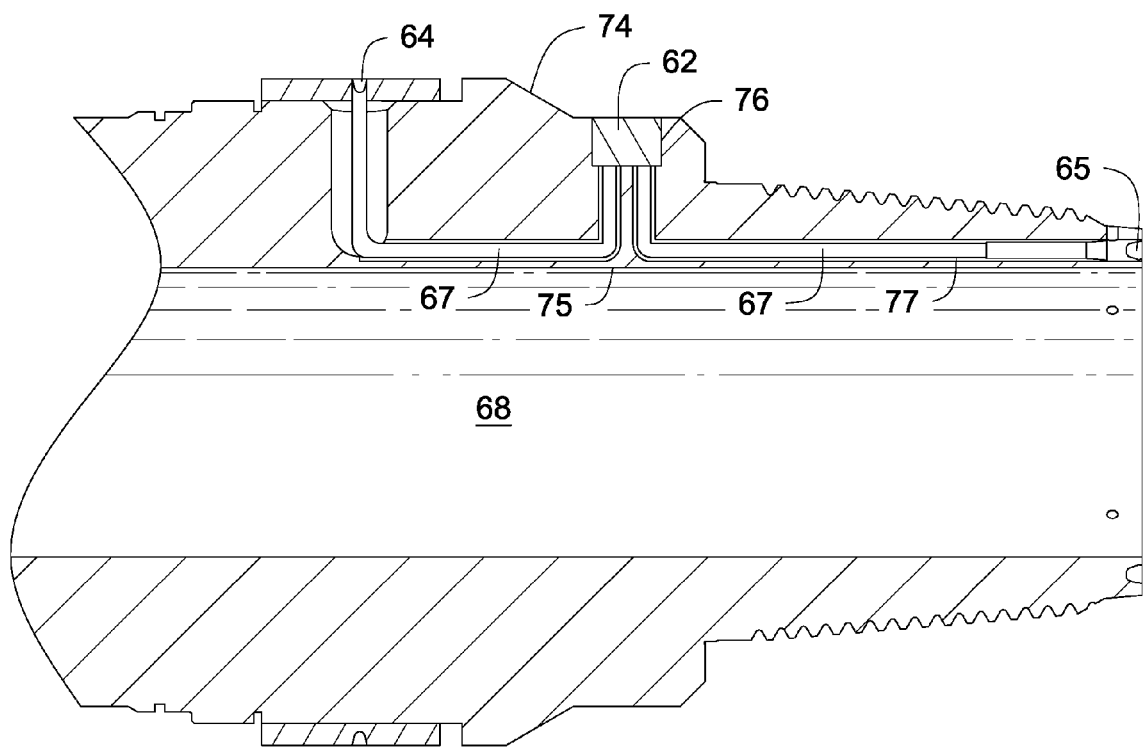
FIG. 8 is a partial cross sectional view of a swivel assembly of the present invention.
Figure 9:
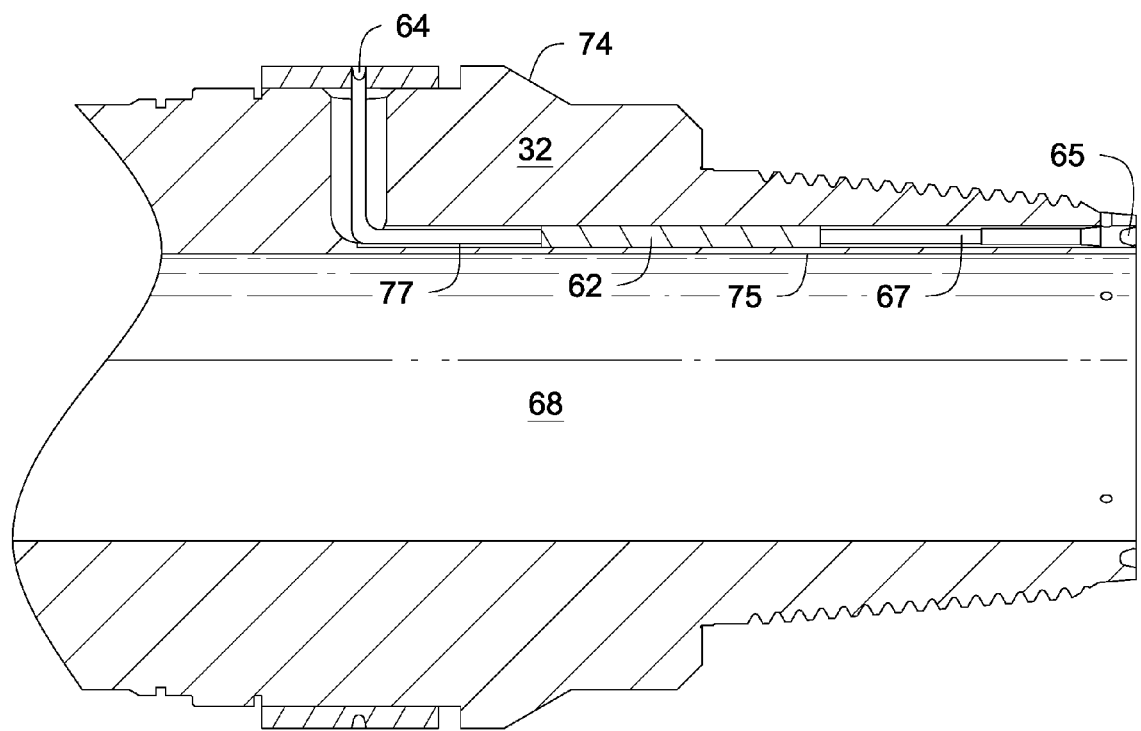
FIG. 9 is a partial cross sectional view of a swivel assembly of the present invention.

FIG. 6 shows an electronic component 62 located between the second and third transmission elements 64, 65. The electronics pack 34 is internally mounted in the inner circumference 75 of the second housing 32. The electronic component 62 may be mechanically fastened to the inner circumference 75 with screws. Alternatively the electronic component 62 may be press-fitted, glued or use other methods known in the art to be secured in the bore of the swivel 68. Drilling mud, lubricants and other fluids, may be present in the bore 68 of the second housing 32 so the casing for the electronic component 62 may be robust and chemical resistant. FIG. 7 discloses an electronics component 62 a recess 76 in the inner circumference 75 of the second housing 32. FIG. 8 discloses a recess 76 in the outer circumference 74 of the second housing 32. FIG. 9 shows an electronic component 62 in the passage 77 in communication with the second and third transmission elements 64, 65.

Figure 10:
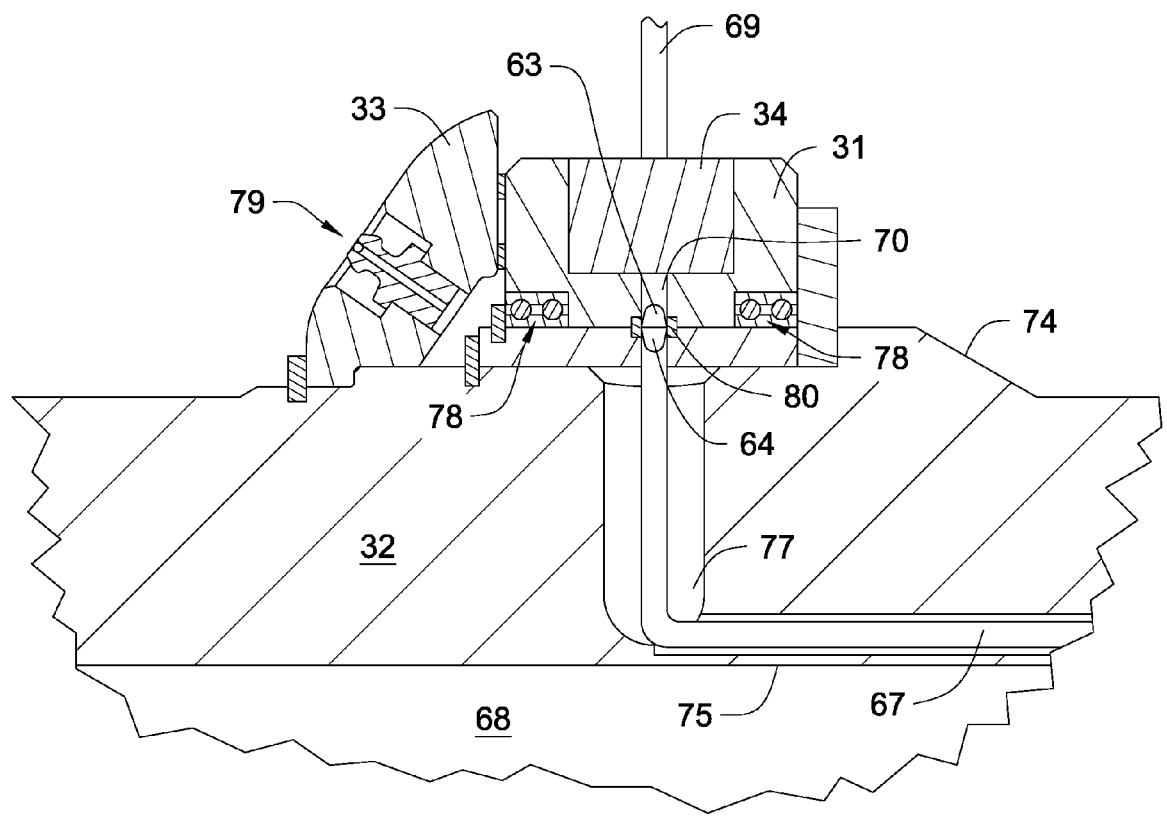
FIG. 10 is a partial cross sectional view of a swivel assembly of the present invention.

FIG. 10 shows a connection between the first and second housing 31, 32 of the swivel assembly 30. The first and second transmission elements 63, 64 are cooperatively arranged such that data transmission may occur. Bearings 78 located in the first housing 31 and adjacent the second housing 32 and allow the rotation of the second housing 32. The shield 33 may be externally mounted to the second housing 32 and rotates with it. A lubricating port 79 allows for lubrication of the bearings 78 without having to remove the shield 33. The lubricating port may be covered by a cap when the lubricating port is not in use. A seal 80 adjacent the transmission elements 63, 64 may protect the transmission elements 63, 64 from lubricants or other fluids, which may block data transmission or cause the transmission elements 63, 64 to short.

Whereas the present invention has been described in particular relation to the drawings attached hereto, it should be understood that other and further modifications apart from those shown or suggested herein, may be made within the scope and spirit of the present invention.

The invention claimed is:

1. A swivel assembly for a downhole tool string, comprising: first and second coaxial housings cooperatively arranged; the first housing comprising a first transmission element in communication with surface equipment; the second housing comprising a second transmission element in communication with the first transmission element and a third transmission element adapted for communication with a network integrated into the downhole tool string; an electronic circuitry in electrical communications with one of the transmission elements; a shield is externally mounted to the first or second housing and is adapted to protect a connection between the first and second housings from debris; and the shield comprises a means for lubricating the connection between the first and second housing.

2. The swivel assembly of claim 1, wherein the second housing is rotational and adapted to transmit a signal between the downhole network and the first housing.

3. The swivel assembly of claim 1, wherein an internal conductor is disposed within a passage of the second housing and connects the second and third transmission elements.

4. The swivel assembly of claim 1, wherein an external conductor connect the first transmission element and surface equipment.

5. The swivel assembly of claim 4, wherein the external conductor is a copper wire, a coaxial a cable, twin axial cable, a triaxial cable, a fiber optic cable, or a ribbon cable.

6. The swivel assembly of claim 1, wherein the electronic circuitry is disposed in housing externally mounted to the first housing.

7. The swivel assembly of claim 1, wherein the electronic circuitry is disposed in housing internally mounted in the second housing.

8. The swivel assembly of claim 1, wherein the electronic circuitry is disposed in housing externally mounted to the second housing.

9. The swivel assembly of claim 1, wherein the electronic circuitry is disposed in a recess in the second housing.

10. The swivel assembly of claim 9, wherein the recess is between the second and third transmission elements.

11. The swivel assembly of claim 9, wherein the recess is disposed in an inner circumference of the second housing or an outer circumference of the second housing.

12. The swivel assembly of claim 1, wherein the electronic circuitry is disposed in a recess in the first housing.

13. The swivel assembly of claim 1, wherein the electronic circuitry comprises components selected from the group consisting of a signal filtering circuit, a signal error checking circuit, a device control circuit, a modem, a digital processor, an optical regenerator, an optical transmitter, an optical receiver, a repeater circuit, a sensor, a router, a switches, memory, an amplifier, a clock source, a data compression circuit, a data rate adjustment circuit, a piezoelectric device, a light, a gauge, a wireless transceiver, a digital/optical converter, an analogue/optical converter, and a microcontroller.

14. The swivel assembly of claim 1, wherein the swivel assembly further comprises an internal power source.

15. A swivel assembly for a downhole tool string, comprising: first and second coaxial housings; the first housing comprising a first transmission element in communication with surface equipment; the second housing comprising a second transmission element in communication with the first transmission element and a third transmission element adapted for communication with a network integrated into the downhole tool string; the second housing having a cylindrical form comprising an inner circumference and an outer circumference, wherein the second housing is disposed within the inner circumference of the first housing; an internal conductor disposed in a passage of the second housing and connecting the second and third transmission elements; a shield externally mounted to the swivel assembly adapted to protect a connection between the first and second housing; an electronic component in communications with the first transmission element and externally mounted to the first housing; a shield is externally mounted to the first or second housing and is adapted to protect a connection between the first and second housings from debris; and the shield comprises a means for lubricating the connection between the first and second housing.

16. The swivel assembly of claim 15, wherein the electronic component comprises components selected from the group consisting of a signal filtering circuit, a signal error checking circuit, a device control circuit, a modem, a digital processor, an optical regenerator, an optical transmitter, an optical receiver, a repeater circuit, a sensor, a router, a switches, memory, an amplifier, a clock source, a data compression circuit, a data rate adjustment circuit, a piezoelectric device, a light, a gauge, a wireless transceiver, a digital/optical converter, an analogue/optical converter, and a microcontroller.

17. The swivel assembly of claim 15, wherein the swivel assembly further comprises an internal power source.

* * * * *